Feb. 17, 1925.
B. G. GOBLE
1,526,473
SELF HEALING NONCOMPRESSION INNER TUBE
Filed May 9, 1922
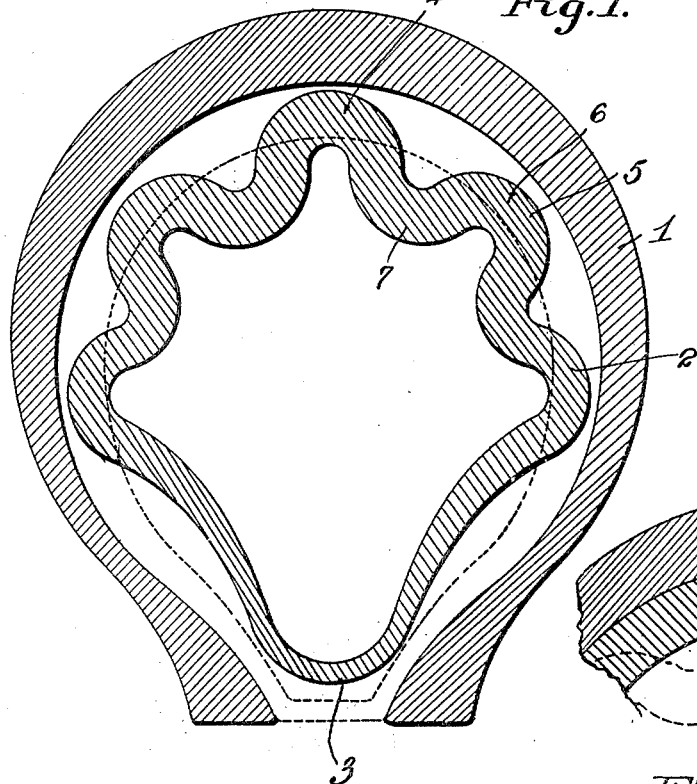
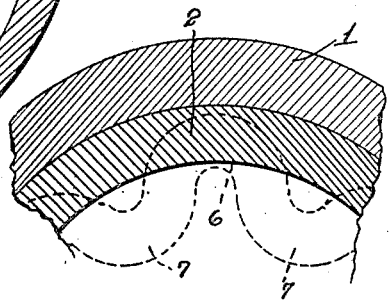
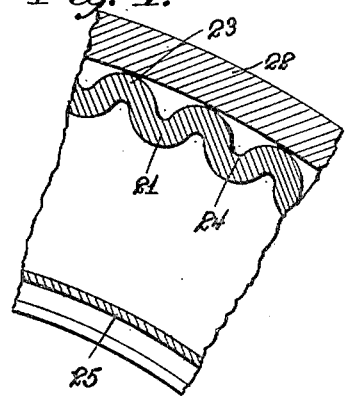
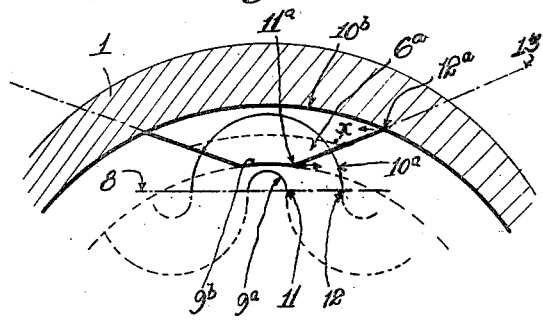
Inventor
B. G. Goble
By Norman B Landrau
Attorney Patented Feb. 17, 1925.

1,526,473

UNITED STATES PATENT OFFICE.

BERT G. GOBLE, OF TULSA, OKLAHOMA.

SELF-HEALING NONCOMPRESSION INNER TUBE.

Application filed May 9, 1922. Serial No. 559,621.

*To all whom it may concern:*

Be it known that I, BERT G. GOBLE, a citizen of the United States, residing at Tulsa, in the county of Tulsa and State of Oklahoma, have invented certain new and useful Improvements in Self-Healing Noncompression Inner Tubes, of which the following is a specification.

This invention relates to pneumatic inner tubes and more particularly to the class of self-healing, non-compression inner tubes for pneumatic tires.

The primary object of the invention is to provide an inner tube of rubber having an inherent tendency to contract after being expanded by a pressure of air in the tube so that an air hole, puncture or perforation in the tube, will close and be sealed.

A further object of the invention is to construct an inner tube of expansible rubber or other suitable materials, but formed with corrugations and convolutions in the tread portion which tend to retain the natural shape against any pressure of air within the tube, so that any diminishing of the air pressure will cause a contracting of the rubber whereby a valve action will be produced to close any perforation in the tube.

A further object of the invention is to provide an inner tube of rubber or equivalent resilient and elastic material molded in such shape that the normal relations of areas of the material of the tube will be changed upon inflation of the tube, whereby the inherent tendency of the tube to resume its molded or normal shape and for the areas of the material of the tube to return to their normal relation will cause air holes, punctures or perforations in the tube to be closed or sealed.

A further object of the invention is to construct an inner tube of rubber or equivalent resilient and elastic material formed with corrugations or substantially ogee undulations which tend to return to their natural shape against pressure of air within the tube, so that puncturing of the tube will allow a relative displacement of the material at opposite sides of the center of thickness of the wall of the tread portion of each undulation whereby a valve action will take place to close any perforation in the tube.

A still further object of the invention contemplates the provision of a pneumatic tube embodying a molded structure of rubber normally having annular alternating convex and concave corrugations merging one with the other and based upon ogee or continuous opposite curves as well as co-operating, upon inflation of the tube, to create oppositely acting opposed forces tending to relatively displace the material of the tube corrugations at opposite sides of the center line of thickness of the wall of the latter, whereby puncturing of the tube will cause or allow such relative displacement of the material and result in sealing of the punctures.

The invention further aims to provide a structure for a pneumatic tube which will readily expand to obtain the desired resiliency for the tire casing, and will in no wise be weakened, but will, on the contrary, have greater inherent strength than is the case in the various types of compression tubes known in the art.

A still further object of the invention contemplates the provision of a moulded corrugated structure of rubber having annular convex and concave corrugations transversely spaced around the tube, the convex and concave portions being alternately arranged and co-operating to create opposed forces working at right angles to the circumferential tread of the tube tending to retract the material after it has been expanded by the air pressure.

Other objects of the invention will appear upon consideration of the following detailed description and accompanying drawing wherein:

Figure 1 is a transverse section through a tire casing and tube constructed in accordance with my invention and illustrating, by full line, the tube in its natural shape, and by dotted lines, in its expanded shape.

Figure 2 is a detail fragmentary section showing a portion of the casing and the expanded tube pressing against the same, the dotted lines designating the natural position of the tube before being expanded.

Figure 3 illustrates diagrammatically the action which takes place in one of the corrugated sections when the tube is expanded.

Figure 4 is a detail fragmentary section of a modification of the structure.

Referring to the drawing by numerals, the casing 1 is of the conventional type and illustrates the ordinary pneumatic tire casing or shoe within which the pneumatic inner tube 2 is to be inserted. The tube is constructed of rubber or other suitable material. The rubber is moulded to form the tube and the wall of the tube is tapered or gradually thickened from its innermost point 3 to the outermost point 4. A series of arcuate corrugations 5 are formed in the tube when it is moulded and these include the convex corrugations 6 and the concave corrugations 7. The corrugations may be spaced apart in any desired spaced relation and it will be understood that their centers may be moved toward or away from each other according to the type of tire within which the tube is used.

The tube is smaller than the inside of the casing with which the tube is used, that is, the area of the outer surface of the tube before it is inflated is less than the area of the inner surface of the casing. This permits the tube to be readily inserted in the casing.

Air is pumped into the tube in the manner well known in the art and sufficient air pressure will cause the convolutions and corrugations to be straightened or flattened out as indicated by the dotted lines in Figure 1, and the full lines in Figure 2, so that the outer surface of the tube is in close contact with the inner surface of the casing. The force of the air against the tube is sufficient to overcome the natural tendency of the convolutions or corrugations to return to their natural shape, and it will be apparent that while the air pressure is maintained the tube will retain its expanded form, but any diminishing of the pressure will permit the tube to return to its natural shape.

In Figure 3 I have attempted to diagrammatically illustrate the distorting which occurs when one of the convolutions or corrugations is expanded. The arcuate corrugation $6^a$, illustrated by the light full lines, is normally semi-circular as shown. The broken line 8, indicates a division between this arcuate section and the adjacent convex section. Assuming that the air pressure is applied to the line $9^a$ of the section, the latter will be spread out until it assumes the position shown in the line $9^b$. At the same time the outer surface of the section indicated by the line $10^a$ will be forced outwardly against the inner surface of the casing, as indicated by the heavy full line $10^b$. The thickness of the rubber between the points 11 and 12, on the line 18, will have been stretched or increased as indicated by the points $11^a$ and $12^a$ on the line 13.

The action of the opposed forces is more clearly brought out by line X, which is the imaginary neutral line that runs through the arcuate section $6^a$ and against which the points $11^a$ and $12^a$ are working to get opposite each other in their natural moulded position. The rubber on the inner and the outer side of the neutral X is continually pushing in opposite directions causing a valve-like action as indicated by the arrows pointing from points $11^a$ and $12^a$. It is the working of the points $11^a$ and $12^a$ in a seesaw action against the neutral center that causes this valve-like action which makes this tube self-healing.

When the corrugation is thus expanded or distorted a displacement of the rubber takes place which may be described as a relative displacement of areas of the rubber or material from radially alined to non-alined position with respect to the material inwardly of and outwardly the center line of thickness of the corrugation. Thus, upon puncturing of the tube, the displacement will occur, as the corrugation will inherently return toward normal condition and thus cause the puncture or opening portion in the outer portion of the corrugation to become disalined with that portion of the opening which extends through the corrugation inwardly of its center line of thickness, whereby this opening or puncture is automatically closed with a sort of slide valve action. It will be readily seen that this distortion is accomplished by the pressure of air being great enough to force the concave and convex convolutions and corrugations outwardly against their natural tendency to retain their original shape. By this action the tensile strength is not in any way reduced but the material is sufficiently expanded to cause it to actively work to resist the air pressure so that in reality opposed forces are working in the expanded rubber to tend to close any perforations which may occur in the tube after it has been inflated.

As is well known in this art, it is quite common to construct a tube of rubber and form certain curvatures in the rubber which give a greater area to the outside of the tube than the inside of the tire casing. This is called the compression type of tube and I desire to point out that the structure herein incorporated and described is not of this type, but may be more properly termed a non-compression tube. In the compression type of tube it is necessary to inflate the tube after it has been forced into the casing, and since the tube is larger than the inside of the casing, the very first operation, namely, the insertion of the tube in the casing, is difficult to accomplish. Even, however, after the compression type of tube is inserted in the casing and an air pressure applied to straighten out the indentations, it is practically impossible to determine exactly how much pressure per square inch is required to force the tube into its rounded compressed shape.

This type of tube will also wrinkle and be pinched at its weakest points, tending to cause a break or rupture of the tube at the wrinkled or pinched portion, so that the desired object is not accomplished. It will be noted from my above description that these difficulties are readily overcome, since the tube may be easily inserted because it is smaller than the casing, and, after being inserted, it will expand to fit a larger size casing and employ its natural tendency to return to its natural shape to resist the air pressure and seal or close any perforation.

The moulded rubber may be of any desired thickness to give the desired retractibility to the material and each of the convolutions or corrugations formed in the rubber will have a co-efficient of retractibility higher than the degree of air pressure required to maintain the tube in properly inflated position, thus permitting the convex and concave corrugations to immediately act to close any perforation which may be made in the tube.

I desire to lay particular stress on the feature of having the corrugations distended or distorted when the tube is inflated so that the two forces, created by the tendency of the alternately spaced convex and concave corrugations, are working against each other in an endeavor to resume their natural shapes and are opposed in this force only by the air pressure in the tube. This constant tendency to resume its natural position, will cause the rubber to effectively close and seal any opening or perforation which may occur in the tube, and this action will continue until the rubber has lost its natural resiliency or until the tube is deflated.

In the modificaton shown in Figure 4 the tube 21 has the corrugations extending transversely around the tube rather than longitudinally as in the above described form. In this case the casing 22 receives the tube 21 and the concave corrugation 23 and convex corrugation 24 are arranged in alternate relation and the wall of the tube is tapered to a relatively thin portion 25. When the tube is inflated the same action occurs, since its outer area is less than the inner area of the casing, so that when the proper air pressure is applied the concave and convex corrugations will straighten out to lie flat against the inner surface of the casing. The same force created by the active tendency of the corrugations to resume their natural shape causes the material to close any perforations which may occur in it.

Minor changes may be made in the relative positions of the concave and convex sections with respect to each other and it will be understood that minor changes may be made in the curvatures of the tube and the tapering of the wall, so long as the structure falls within the scope of the claims hereunto appended.

What I claim is:

1. A pneumatic inner tube for pneumatic tires comprising a moulded rubber tube, having a series of convex and concave corrugations formed therein when the tube is moulded, the entire inner area of the surface of the tube, being less than the entire inner area of the inner surface of the tire casing, the walls of the tube being gradually tapered in thickness from a relatively thin central portion to a comparatively thick outer portion adjacent the tread of the casing, the said moulded rubber material being adapted to expand within the casing, when the tube is inflated, whereby the said convex and concave corrugations will be distorted and flattened out firmly against the inner surface of the casing, the corrugations having a coefficient of retractibility higher than the degree of air pressure required to maintain the tube in inflated position somewhat below its full expansion, whereby the convex and concave corrugations may exercise their inherent tendency to return to normal position and thereby create a force working at right angles to the circumferential tread of the tube, to seal any perforation occurring in the tube with a valve-like action.

2. A pneumatic inner tube for pneumatic tires, comprising a tube of a size smaller than the interior of the casing, and moulded of resilient rubber to form a series of convex and concave corrugations, having a predetermined shape and curvature, the wall of the tube being gradually tapered in thickness from a relatively thin portion at the inner central point of the tube, to a relatively thick portion of the outer central portion of the tube adjacent the tread of the casing, the said moulded convex and concave corrugations being adapted to expand, when an air pressure is applied in the tube, whereby the outer surface of the tube will firmly and evenly engage the inner surface of the tire, each of the said convex and concave corrugations co-operating with each other when they have been distended to create opposed forces, working at right angles to the circumferential tread of the tube, produced by the natural tendency of the said corrugations, to return to their natural form, the air pressure in the tube being great enough to overcome this natural tendency of the corrugations, thus maintaining them in distended, expanded form, whereby they will tend to seal or close any perforations in the tube with a valve-like action.

In testimony whereof I have affixed my signature.

BERT G. GOBLE.